US012566652B2

(12) United States Patent (10) Patent No.: US 12,566,652 B2
Krishnan et al. (45) Date of Patent: Mar. 3, 2026

(54) SYSTEMS AND METHODS FOR TIME-SERIES BASED MACHINE LEARNING ANOMALY DETECTION AND PREVENTION

(71) Applicant: Dell Products, L.P., Round Rock, TX (US)

(72) Inventors: Suresh K. Krishnan, Shrewsbury, MA (US); Ramesh Doddaiah, Westborough, MA (US); Mikhail Salnikov, Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/393,939

(22) Filed: Dec. 22, 2023

(65) Prior Publication Data

US 2025/0208940 A1 Jun. 26, 2025

(51) Int. Cl.
*G06F 11/00* (2006.01)
*G06F 11/07* (2006.01)

(52) U.S. Cl.
CPC ...... *G06F 11/0766* (2013.01); *G06F 11/0745* (2013.01)

(58) Field of Classification Search
CPC ............. G06F 11/0766; G06F 11/0745; G06F 11/079; G06F 11/0793; G06F 11/3006; G06F 11/0709; G06F 11/3041
See application file for complete search history.

(56) References Cited

U.S. PATENT DOCUMENTS

| | | | |
|---|---|---|---|
| 2023/0281070 A1* | 9/2023 | Harutyunyan | ........ G06F 18/214 |
| | | | 714/37 |
| 2024/0330100 A1* | 10/2024 | Zafer | .................. G06F 11/0793 |
| 2024/0345911 A1* | 10/2024 | Bellam | ............... G06F 11/0709 |
| 2025/0068734 A1* | 2/2025 | Pletka | .................. G06F 21/564 |
| 2025/0110820 A1* | 4/2025 | Ghosh | ................. G06F 11/0709 |

* cited by examiner

*Primary Examiner* — Joseph D Manoskey
(74) *Attorney, Agent, or Firm* — Fogarty LLP

(57) ABSTRACT

Systems and methods for time-series based machine learning anomaly detection and prevention are described. In an illustrative, non-limiting embodiment, an Information Handling System (IHS) may include: a processor; and a memory coupled to the processor, where the memory includes program instructions store thereon that, upon execution by the processor, cause the IHS to: obtain communication data associated with the IHS for a plurality of time windows, including a particular time window, and previous time windows before the particular time window; determine, using a machine learning model, that the communication data for the particular time window includes an anomaly; and based on the determination, perform one or more actions. In some embodiments, the program instructions further cause the IHS to: based on the communication data, determine time-series data for a plurality of attributes of the communication data; and determine that an attribute includes an outlier in the particular time window.

16 Claims, 7 Drawing Sheets

500

"BACK-IN-TIME" ANOMALY DETECTION AND PREVENTION

Figures 7A, 7B:
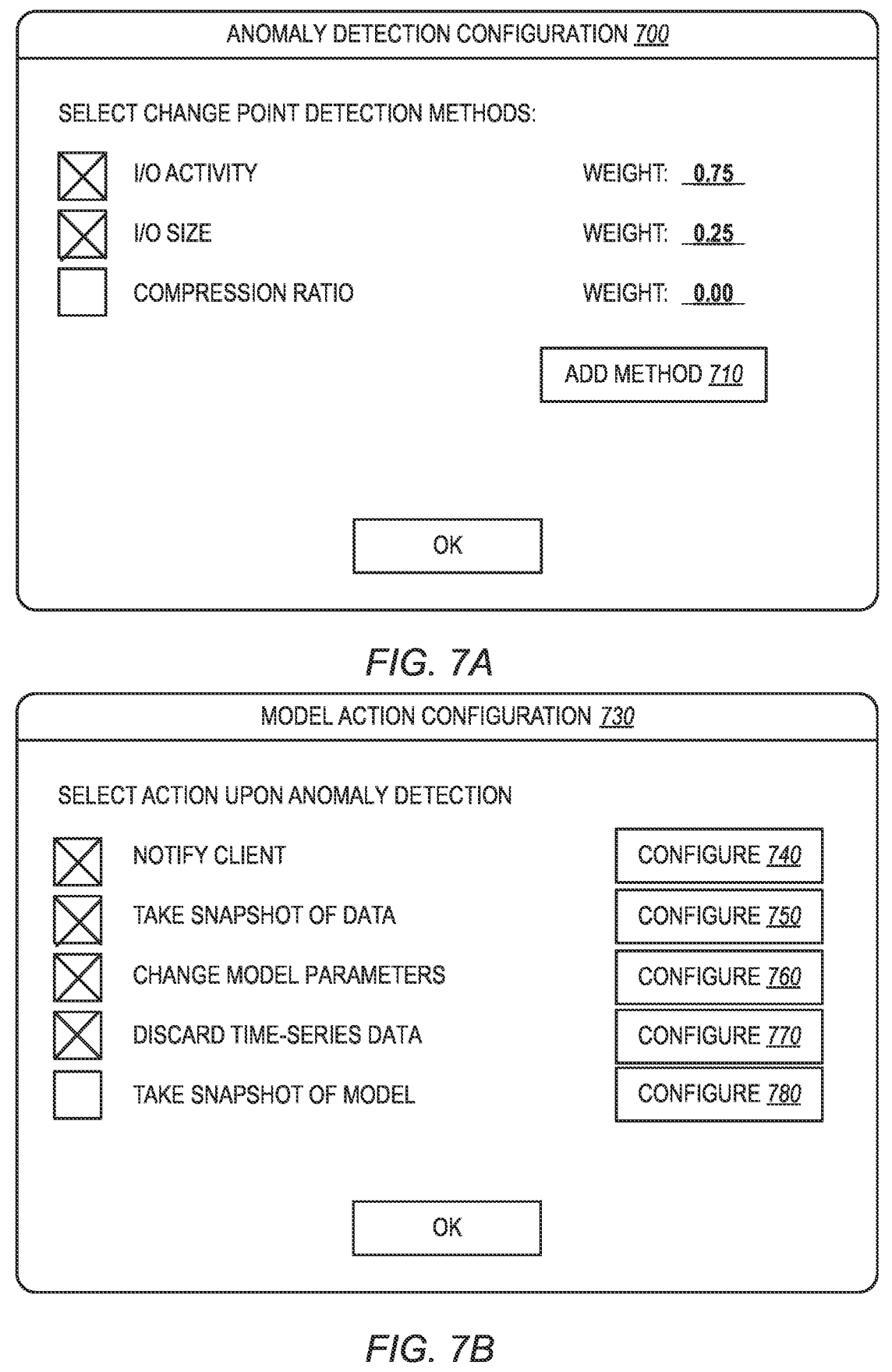

ANOMALY DETECTION CONFIGURATION 700

SELECT CHANGE POINT DETECTION METHODS:

☒   I/O ACTIVITY            WEIGHT:   0.75

☒   I/O SIZE                WEIGHT:   0.25

☐   COMPRESSION RATIO       WEIGHT:   0.00

ADD METHOD 710

MODEL ACTION CONFIGURATION 730

SELECT ACTION UPON ANOMALY DETECTION

☒   NOTIFY CLIENT                CONFIGURE 740

☒   TAKE SNAPSHOT OF DATA      CONFIGURE 750

☒   CHANGE MODEL PARAMETERS   CONFIGURE 760

☒   DISCARD TIME-SERIES DATA    CONFIGURE 770

☐   TAKE SNAPSHOT OF MODEL     CONFIGURE 780

SYSTEMS AND METHODS FOR TIME-SERIES BASED MACHINE LEARNING ANOMALY DETECTION AND PREVENTION

FIELD

This disclosure relates generally to Information Handling Systems (IHSs), and more specifically, to systems and methods for time-series based machine learning anomaly detection and prevention.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Time-series analysis holds increasing significance across various domains such as finance, supply chain, and business. Time-series data consists of sequences of measurements chronologically indexed, revealing the evolving behavior of systems. This behavior is subject to change over time, influenced by external events and internal systematic shifts. The capacity to efficiently scrutinize extensive time-series data and promptly adapt to its fluctuations has become paramount in contemporary computing systems.

SUMMARY

Systems and methods for time-series based machine learning anomaly detection and prevention are described. In an illustrative, non-limiting embodiment, an Information Handling System (IHS) may include: a processor; and a memory coupled to the processor, where the memory includes program instructions store thereon that, upon execution by the processor, cause the IHS to: obtain communication data of the IHS for a particular time window; determine, using a machine learning model, that the communication data for the particular time window includes an anomaly; and based, at least in part on the determination, perform one or more actions.

In some embodiments, the machine learning model includes a multivariate time-series based machine learning model. In some embodiments, the program instructions further cause the IHS to: obtain communication data of the IHS for previous time windows before the particular time window, where the machine learning model was updated using the communication data of the IHS for previous time windows.

In some embodiments, to determine, using the multivariate time-series based machine learning model, that the communication data for the particular time window includes the anomaly, the program instructions further cause the IHS to: based, at least in part, on the communication data for the particular time window and the communication data for the previous time windows, determine time-series data for a plurality of attributes of the communication data; determine, based, at least in part, on the time series data, that at least one of the plurality of attributes of the communication data include an outlier in the particular time window; and determine that the communication data for the particular time window includes the anomaly based, at least in part, on the outlier of the at least one attribute of the communication data in the particular time window.

In some embodiments, the plurality of attributes of the communication data include an input/output (I/O) activity of the communication data. In some embodiments, the plurality of attributes of the communication data include an input/output (I/O) size of the communication data. In some embodiments, the plurality of attributes of the communication data include a compression ratio of the communication data.

In some embodiments, the machine learning model includes a multivariate time-series based machine learning model, where to determine, using the multivariate time-series based machine learning model, that the communication data for the particular time window includes the anomaly, the program instructions further cause the IHS to: determine a plurality of weights for a respective plurality of attributes of the communication data; determine, using the multivariate time-series based machine learning model, information regarding each of the plurality of attributes of the communication data for the particular time window; and determine that the communication data for the particular time window includes the anomaly based, at least in part, on the plurality of weights for the respective plurality of attributes, and the information regarding each of the plurality of attributes for the particular time window.

In some embodiments, the one or more actions include discarding the communication data of the IHS for the particular time window. In some embodiments, the one or more actions include taking a snapshot of the machine learning model. In some embodiments, the one or more actions include taking a snapshot of stored communication data of the IHS for previous time windows before the particular time window. In some embodiments, the one or more actions include reporting the anomaly to a user or administrator of the IHS. In some embodiments, the one or more actions include preventing the machine learning model from being updated with the communication data for the particular time window. In some embodiments, the IHS is an edge gateway or an edge server, where the one or more actions include at least one of: prevent a synchronization of the communication data with a central edge orchestrator; or prevent the machine learning model from being transmitted to the central edge orchestrator.

In another illustrative, non-limiting embodiment, a method includes: obtaining communication data associated with an Information Handling System (IHS) for a plurality of time windows, including a particular time window, and a plurality of previous time windows before the particular time window; determining, using a machine learning model, that the communication data for the particular time window includes an anomaly; and based, at least in part, on the determination, performing one or more actions.

In some embodiments, determining, using the machine learning model, that the communication data for the particular time window includes the anomaly further includes: based, at least in part, on the communication data for the plurality of time windows, determine time-series data for a plurality of attributes of the communication data; determining, based, at least in part, on the time series data, that at least one of the plurality of attributes of the communication data include an outlier in the particular time window; and determining that the communication data for the particular time window includes the anomaly based, at least in part, on the outlier of the at least one attribute of the communication data in the particular time window.

In some embodiments, performing the one or more actions include at least one of: discarding the communication data for the particular time window; taking a snapshot of the machine learning model; taking a snapshot of stored communication data regarding the plurality of previous time windows before the particular time window; reporting the anomaly to a user or administrator of the IHS; preventing the machine learning model from being updated with the communication data for the particular time window; preventing a synchronization of the communication data with a central edge orchestrator; or preventing the machine learning model from being transmitted to the central edge orchestrator.

In another illustrative, non-limiting embodiment, one or more non-transitory computer-readable storage media store program instructions that when executed on or across one or more processors of an Information Handling System (IHS), cause the one or more processors to: obtain communication data associated with an Information Handling System (IHS) for a plurality of time windows, including a particular time window, and a plurality of previous time windows before the particular time window; determine, using a machine learning model, that the communication data for the particular time window includes an anomaly; and based, at least in part, on the determination, perform one or more actions.

In some embodiments, to determine, using the machine learning model, that the communication data for the particular time window includes the anomaly, the program instructions further cause the one or more processors to: based, at least in part, on the communication data for the plurality of time windows, determine time-series data for a plurality of attributes of the communication data; determine, based, at least in part, on the time series data, that at least one of the plurality of attributes of the communication data include an outlier in the particular time window; and determine that the communication data for the particular time window includes the anomaly based, at least in part, on the outlier of the at least one attribute of the communication data in the particular time window.

In some embodiments, to perform the one or more actions, the program instructions further cause the one or more processors to: discard the communication data for the particular time window; take a snapshot of the machine learning model; take a snapshot of stored communication data regarding the plurality of previous time windows before the particular time window; report the anomaly to a user or administrator of the IHS; prevent the machine learning model from being updated with the communication data for the particular time window; prevent a synchronization of the communication data with a central edge orchestrator; or prevent the machine learning model from being transmitted to the central edge orchestrator.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIGS. 7A and 7B illustrate example user interfaces to configure different aspects of a time-series based machine learning anomaly detection and prevention system, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
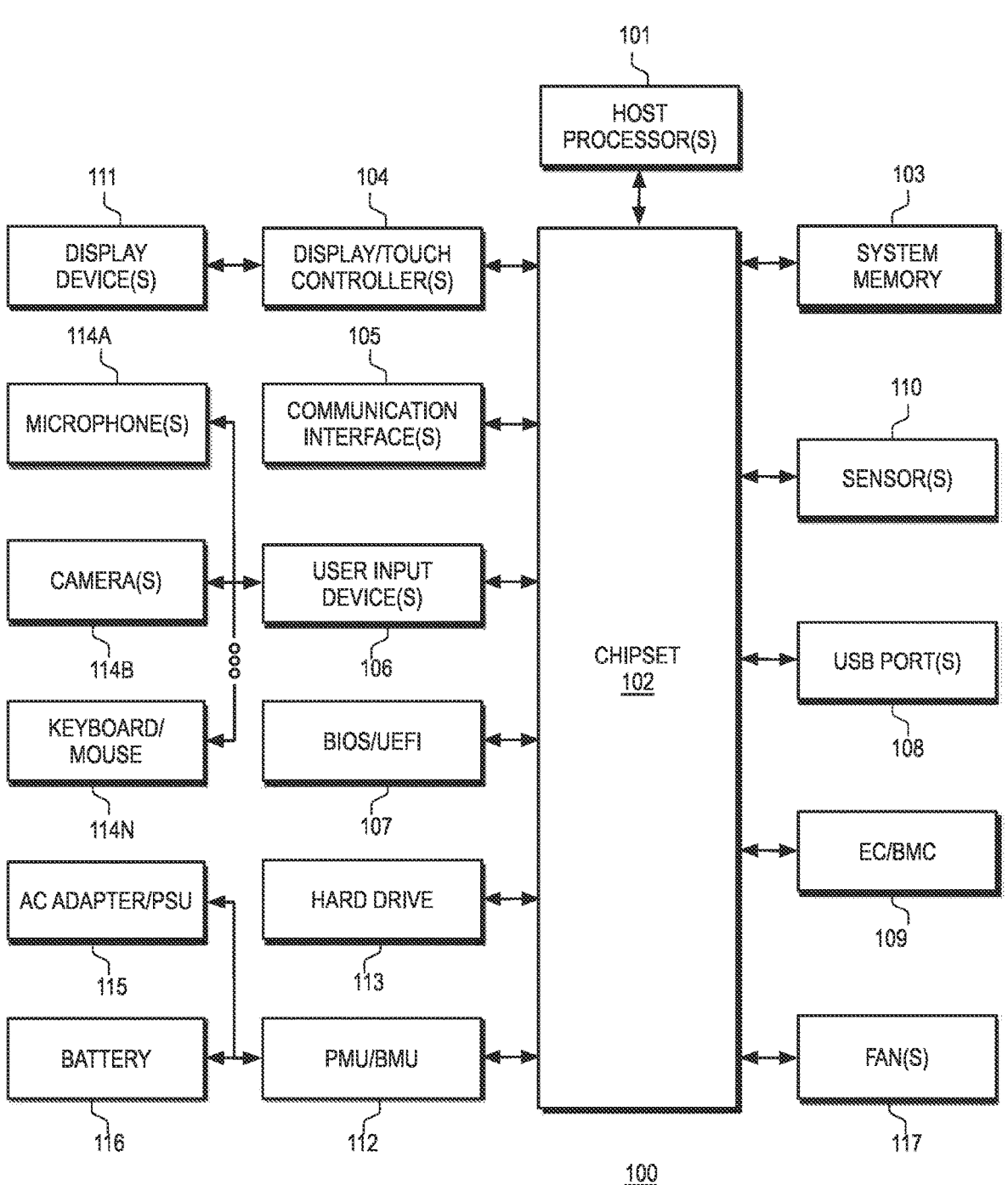
FIG. 1 is a diagram illustrating examples of hardware components of an Information Handling System (IHS), according to some embodiments.

FIG. 1 is a block diagram of hardware components of IHS 200, which may be used to implement the systems and methods for time-series based machine learning anomaly detection and prevention.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS 400 (FIG. 4) for use by IHS 100. BIOS 107 provides an abstraction layer that allows host OS 400 to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Federated learning (also known as collaborative learning) is a machine learning technique that trains an algorithm via multiple independent sessions, each using its own dataset. This approach stands in contrast to traditional centralized machine learning techniques where local datasets are merged into one training session, as well as to approaches that assume that local data samples are identically distributed. Federated learning enables multiple actors to build a common, robust machine learning model without sharing data, thus addressing critical issues such as data privacy, data security, data access rights and access to heterogeneous data. Its applications engage industries including defense, telecommunications, Internet of Things, and pharmaceuticals.

With federated learning, a cloud model can be a global model, and a local model can run on the edge devices or the edge servers. However, because of privacy concerns, a lot of entities may not be willing to share their private data globally. With federated learning, the edge devices or servers don't need to send their private details or private data from their local region to a global region, for example. Instead, the model in the local region can be trained with their private data, and then only the trained model is sent to the global region. Therefore, with federated learning, only the model gets updated, for example, from the local region to the global region, without any data transfer of potentially private data.

Therefore, edge servers and gateways can manage several edge compute endpoints (sensors and equipment) across different geographical locations. The data collected on edge gateways can be analyzed locally, and a machine learning model can be shared across the ecosystem as part of federated learning. Then, in some embodiments, the aggregated edge data can be synced to the cloud or edge orchestrator periodically based on business needs.

However, a ransomware attack at an edge server can propagate through the edge orchestrator, even affecting all the edge devices eventually. As part of federated learning, the malicious model at the edge might be shared to other edge servers through an edge orchestrator.

Therefore, some embodiments of the systems and methods for time-series based machine learning anomaly detection and prevention, described herein, prevent the poisoning process at the edge-level, in order to avoid spreading across multiple devices. Some embodiments employ a time-series based machine learning method to automatically create back-in-time instant Snapshots ("iSnap") to protect data before a ransomware attack hits the edge devices. Some embodiments can provide a solution to prevent the local model from learning from corrupted data.

Figure 2:
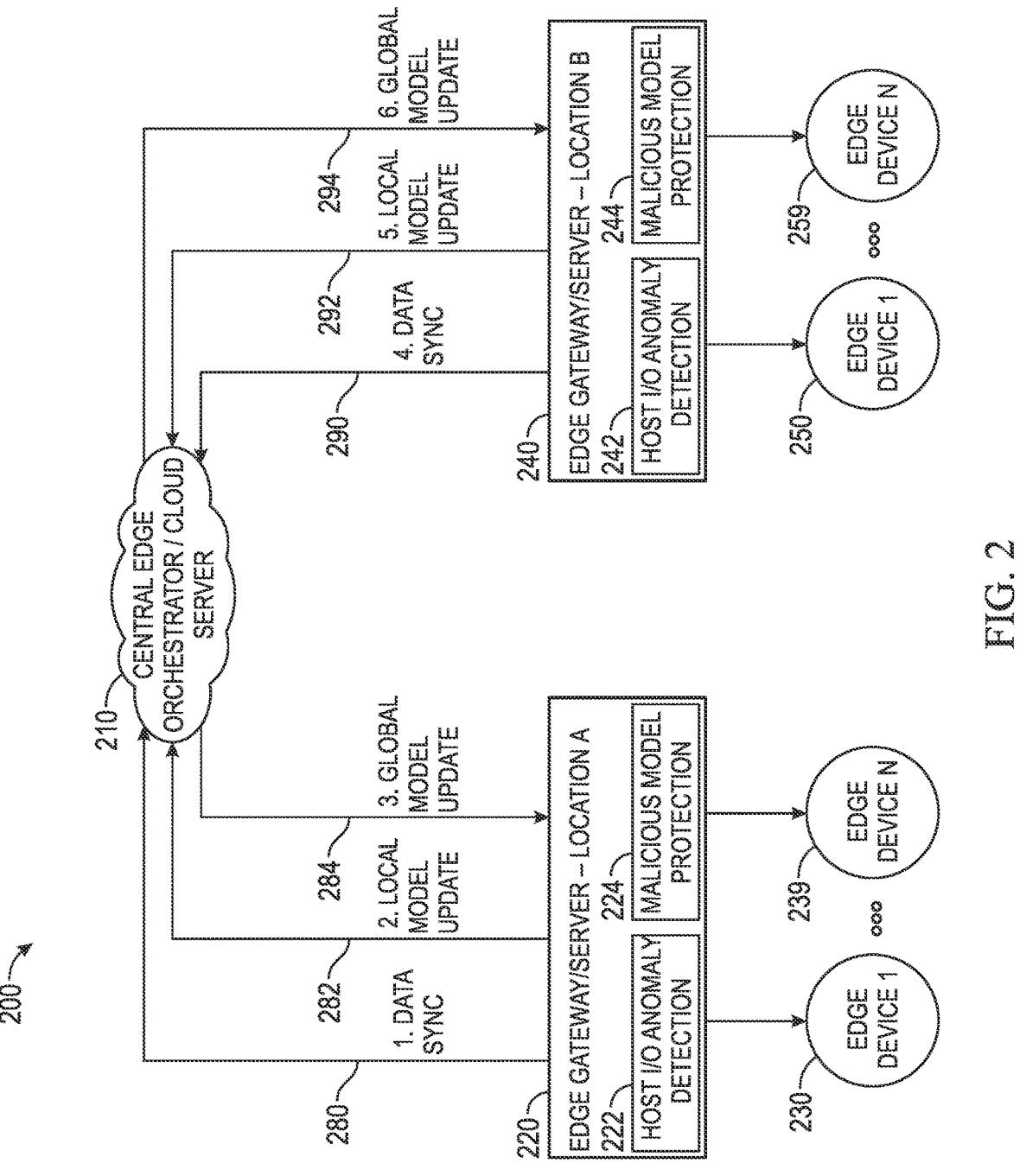
FIG. 2 is a diagram illustrating an example of edge ecosystem 200 that can benefit from time-series based machine learning anomaly detection and prevention, according to some embodiments.

FIG. 2 is a diagram illustrating an example of edge ecosystem 200 that can benefit from time-series based machine learning anomaly detection and prevention, according to some embodiments. In some embodiments, the components of the edge ecosystem 200 may be instantiated, at least in part, through the execution of program instructions stored in system memory 103 and executed by host processor(s) 101 of IHS 100.

In FIG. 2, there are multiple edge devices (230 . . . 239, 250 . . . 259). Those edge devices are connected to the gateways (220, 240) and those gateways communicate with the central edge orchestrator/cloud server 210. During a malicious attack, such as a ransomware attack or some other type of attack that keeps happening to every organization, in order to counteract the attack, the attack must first be identified. In addition, the attack (e.g., ransomware attack) needs to be identified in a federated learning infrastructure applied to an Edge ecosystem.

A solution, according to some embodiments, to identify an attack in a federated learning infrastructure applied to an edge ecosystem, can be built on time-series models. Time-series models can include classical time-series models, or deep-learning based time-series models, or other types of time-series machine learning models, depending on the embodiment.

Therefore, FIG. 2 depicts the edge gateways and/or servers (220, 240) that employ "back-in-time" data protection methods and mechanisms. For example, edge gateway/server at location A (220) employs a host input-output ("I/O") anomaly detection component 222 and a malicious model protection component 224. As another example, edge gateway/server at location B (240) employs a host I/O anomaly detection component 242 and a malicious model protection component 244. Edge gateway/server at location A (220) will provide host I/O anomaly detection 222 and/or malicious model protection 224 before engaging in a data synchronization operation 280, a local model update operation 282, or a global model update operation 284. Edge gateway/server at location B (240) will provide host I/O anomaly detection 242 and/or malicious model protection 244 before engaging in a data synchronization operation 290, a local model update operation 292, or a global model update operation 294.

Anomalies denote sudden variations in one or more attributes within time-series data, often signifying shifts between distinct states in a system's behavior. Swift and accurate detection of these anomalies is crucial for effective planning and optimal resource allocation. Yet, the development of a robust real-time multivariate time-series based machine learning model remains a formidable challenge. Consequently, computing systems equipped for such detection often operate inefficiently. Crafting sophisticated anomaly detection models demands considerable time and effort for development and fine-tuning. Moreover, these models are frequently integrated into domain-specific data analysis systems, making them less adaptable for different data sets or to trigger diverse programmatic actions.

The host I/O anomaly detection components (222, 242) can, in some embodiments, analyze I/O activity, and detect different kinds of I/O anomalies. For example, the host I/O anomaly detection components (222, 242) can, in some embodiments, detect anomalous I/O writes and/or reads, such as a write after a read to a same data location. As another example, the host I/O anomaly detection components (222, 242) can, in some embodiments, detect anomalous I/O sizes (e.g., in kilobytes (KB)), such as capturing an anomalous I/O size pattern. As another example, the host I/O anomaly detection components (222, 242) can, in some embodiments, detect an anomalous compression ratio, such as capturing an anomalous I/O compressibility pattern. The host I/O anomaly detection components (222, 242) can detect other kinds of I/O anomalies, and these above examples should not be construed as limiting.

After the host input-output ("I/O") anomaly detection component 222 and/or the malicious model protection component 224 have performed their appropriate analysis, then the edge gateways/servers (220, 240) can engage in the one or more data synchronization or model updates. In some embodiments, the edge gateways/servers (220, 240) perform a data synchronization (280, 290) with the central edge orchestrator and/or cloud server 210. However, in some embodiments with federated learning, the data synchronization (280, 290) with the central edge orchestrator and/or cloud server 210 may not be performed. In some embodiments, the edge gateways/servers (220, 240) provide an update of their local machine learning model (282, 292) to the central edge orchestrator and/or cloud server 210. In some embodiments, the edge gateways/servers (220, 240) receive an update to the global machine learning model (284, 294) from the central edge orchestrator and/or cloud server 210.

Figure 3:
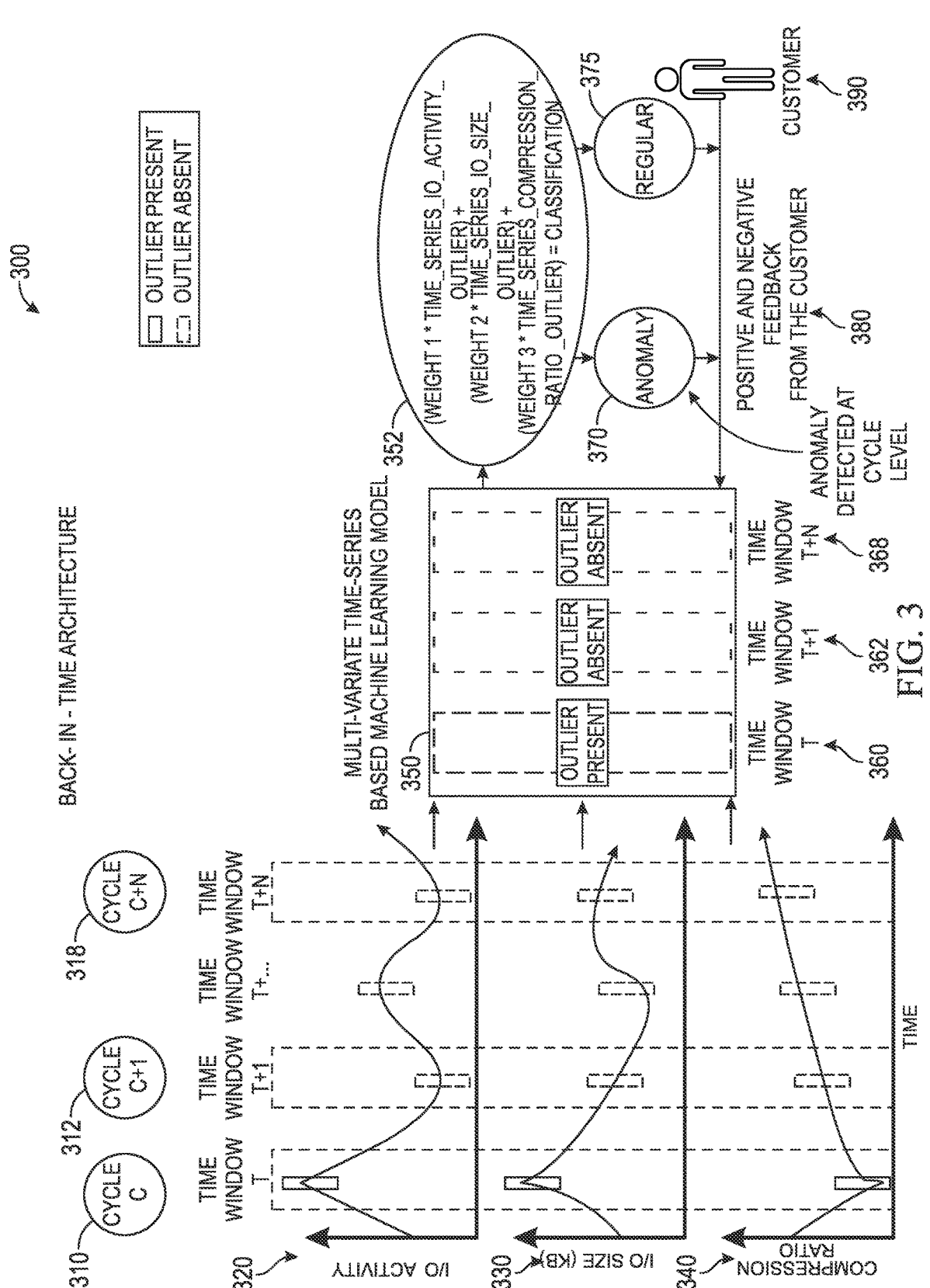
FIG. 3 is an architecture diagram illustrating the operation of the systems and methods for time-series based machine learning anomaly detection and prevention, according to some embodiments.

FIG. 3 is an architecture diagram 300 illustrating the operation of the systems and methods for time-series based machine learning anomaly detection and prevention, according to some embodiments. In some embodiments, architecture diagram 300 may be instantiated, at least in part, through the execution of program instructions stored in system memory 103 and executed by host processor(s) 101 of IHS 100.

Whenever there is any read or write activity to an edge device (i.e., incoming I/Os) those I/Os can be targeted to specific devices. The I/Os can come through the edge devices, and be destined for a specific device such as a flash drive. The read or write can be going to specific regions of this flash storage.

Statistics of the I/Os can be kept, such as the type of I/O (e.g., a read or a write), and/or the size of the I/O, and/or a compression ratio of the I/O. For example, different types of data operations have certain kinds of I/O sizes. Streaming video usually use large I/O sizes. Other kinds of data operations have small I/O sizes, such as checking the temperature on a specific sensor where the data will be only a few bytes of data. Therefore, based on the type of an edge device, it can be determined what size of the data that particular edge device generally receives. Therefore, when an a I/O is received on a specific device, such as on a specific edge component, and is routed a specific I/O device, such as a solid-state drive ("SSD") associated with the edge component, statistics can be kept regarding that I/O.

In addition, statistics can be kept for a specific extent. Statistics can be collected at the extent level. An extent is a contiguous block of storage space (e.g., disk space) that can range in size. Some extents have a minimum size of a single page (e.g., 2048 bytes), for example. Different kinds of extents can have different maximum sizes. Some extents have a maximum size of 65,535 pages (e.g., 134,215,680 bytes), while some extents have a maximum size of 536,870,912 pages, for example.

Statistics can be collected, in some embodiments, per a certain amount or extent of data, such as per megabyte (MB) of data, or per 2 MBs of data, for example. Statistics can be collected at a particular granularity, in some embodiments.

Statistics can be collected at the extent level. For a particular extent, statistics can be checked to a historical set of statistics. For example, the historical compression ratio that this particular extent is receiving on this particular HDD can be determined and checked.

For example, if the I/O includes Wikipedia data, the compression ratio of that Wikipedia data can be extremely high. However, if the I/O includes images, the compression ratio of the images might be very close to 0, because the images will be more or less already compressed with the image file format that is used to store the images (e.g., JPEG format). Therefore, the compression ratio that is historically used on this particular extent belonging to device D can be captured.

Therefore, the collected statistics can include the number of I/Os and/or the sequence of I/Os. For example, the collected statistics can include what is a typical number of writes that are received, or a typical number of reads that are received, or a typical number of writes after reads. These I/O patterns can be captured along with different dimensions, sizes, and compression ratios of the data.

In addition, the incoming I/Os can be split into multiple time windows. FIG. 3 shows multiple time windows, for example T, T+1, . . . T+N. Each time window T is of a particular number of seconds or minutes. Each time window T forms a cycle C. FIG. 3 depicts cycle C (310) corresponding to time window T, cycle C+1 (312) corresponding to time window T+1, and cycle C+N (318) corresponding to time window T+N. Every I/O on an edge device is part of a cycle in memory. Therefore, the collected statistics also have a time dimension.

Data can be collected at an extent level at different time windows, in some embodiments. The time window can vary based on the embodiment or implementation. In some embodiments, a time window might be 10 minutes, for example, such as between 11:00 AM to 11:10 AM. In some embodiments, a time window might be 10 seconds, for example. The time window can be customer configurable, in some embodiments. Therefore, data can be collected at every (or at least most) time window. Once the data is at least partially collected for a time window, then statistics can be determined for that time window's data.

The collected data, in some embodiments, first can be stored in a temporary storage (e.g., RAM) before being transferred to a more permanent storage (e.g., SSD). For example, whatever data is received during a time window (e.g., between 11:00 to 11:10 if the time window is 10 minutes), then that data can be stored in the temporary storage (e.g., RAM). Therefore, any I/Os are received after the beginning of the time window, and any I/Os received until the end of the time window can get accumulated in the temporary storage. In some embodiments, the data for a time window is not pushed to the permanent storage device immediately. While being stored in the temporary storage, the data can be marked as to what particular extent on what permanent storage device (e.g., SSD) this data is for.

By first storing the incoming data in temporary storage, an explicit buffer in time can be created by the "data cache," which is the storage of the data for a time window in temporary storage. This buffer in time allows data to be integrated into permanent storage, or integrated with a machine learning model sometime after it is received. Harmful data from a previous time window can be discarded before it is integrated, thereby enabling what can be referred to as a "back in time" architecture.

Therefore, before pushing the data to the permanent storage, according to some embodiments, the data can be kept in the temporary storage (e.g., DRAM), where an anomaly detection algorithm can be applied. If, while or after it is run, the anomaly detection algorithm detects any anomaly, then all the data collected for the entire time window can be discarded, in some embodiments. As an analogy, assume one receives a file from third party, where a virus has been injected into the file. As soon as the file is opened, or as soon as an attachment is opened, the virus will infect the IHS. In this analogy, soon after an attachment is received, an anomaly detection algorithm is executed to determine whether it's a clean attachment or whether it has any viruses. If it doesn't have any viruses, then it can be opened. If it has any viruses, then the data can be immediately thrown out, so that it will not be download it to the permanent storage at all.

In addition, with a federated learning infrastructure, any anomalous data should not be used to train any machine learning models. Instead of continuously training machine learning models as the data is received, some embodiments of present disclosure create a time-window cushion (e.g., of 10 minutes, if the time window is 10 minutes). Any machine learning models would only be trained at the end of the time window, after any anomaly detection algorithm is executed using the data of the time window, where the results of the anomaly detection algorithm do not indicate an unacceptable level of anomalies. Only then can data from the last period of time of the last time window be used to train any machine learning models, according to some embodiments. Data which has already been certified by the anomaly detection algorithm can be used to train any machine learning models. Therefore, according to some embodiments, any models are trained on data from the previous time window, not on data from the current time window. Therefore, some embodiments wait until all the data has been collected for a particular time window, and do not train any machine learning model on data from a particular time window, until data collection for that particular time window is completed.

Therefore, referring back to FIG. 3, a local edge model can be trained on uncorrupted data from the previous cycles C−1 and before. In some embodiments, the model is not retrained from scratch, but instead includes information from all the previous time windows (e.g., until and including cycle C−1), and not just the last time window.

Various I/O characteristics such as I/O Size (depicted by the I/O size time-series 330), I/O Activity (depicted by the I/O activity time-series 320), and compression sizes or ratios (depicted by the compression ratio time-series 340) can be considered by a multi-variate time-series based machine learning model (350) to detect a device level anomaly. A particular time window can be flagged as an outlier if the I/O sizes 330 of the particular time window are drastically different compared to historical analysis. A particular time window can be flagged as an outlier if the compression (e.g., data reduction) ratios 340 of the particular time window are drastically different compared to historical analysis. A particular time window can be flagged as an outlier if the I/O activity 320 (such as Write-after-Read) of the particular time window are drastically different compared to historical analysis.

FIG. 3 depicts that the data of data collection cycle C 310 (corresponding to time window T) indicates that each of the 3 I/O characteristics of the 3 time-series (320, 330, 340) have an outlier. FIG. 3 depicts the data of data collection cycle C+1 (312) (corresponding to time window T+1) indicates that each of the 3 I/O characteristics of the 3 time-series (320, 330, 340) do not have an outlier. FIG. 3 depicts the data of time window T+ . . . indicates that each of the 3

I/O characteristics of the 3 time-series (320, 330, 340) do not have an outlier. FIG. 3 depicts the data of data collection cycle C+N 318 (corresponding to time window T+N) indicates that each of the 3 I/O characteristics of the 3 time-series (320, 330, 340) do not have an outlier.

The results of the 3 time-series (320, 330, 340) are inputs to a multi-variate time-series based machine learning model 350. The a multi-variate time-series based machine learning model 350 determines, for an individual time window, whether an outlier is present for each of the 3 I/O characteristics.

FIG. 3 depicts that after the data collection of time window T (360) is completed, and the data is analyzed, then the multi-variate time-series based machine learning model 350 determines that an outlier is present. FIG. 3 depicts that after the data collection of time window T+1 (362) is completed, and the data is analyzed, then the multi-variate time-series based machine learning model 350 determines that an outlier is absent. FIG. 3 depicts that after the data collection of time window T+N (368) is completed, and the data is analyzed, then the multi-variate time-series based machine learning model 350 determines that an outlier is absent.

The presence or absence of an outlier for each of the 3 I/O characteristics, and/or the magnitude of the outlier, along with a weight for each of the 3 I/O characteristics, can be used to classify whether an anomaly is present or not in a particular cycle corresponding to a particular time window. A formula, such as the formula of 352, can be used to classify whether an anomaly is present or not in a particular cycle corresponding to a particular time window. Such a formula 352 can be calculated by the multi-variate time-series based machine learning model 350, or as a separate calculation using the outputs from the multi-variate time-series based machine learning model 350. The formula can be:

$$(Weight_1 * Time\_Series\_I/O\_Activity\_Outlier) + \\ (Weight_2 * Time\_Series\_I/O\_Size\_Outlier) + \\ (Weight_3 * Time\_Series\_Compression\_Ratio\_Outlier) \\ = Anomaly\ Classification$$

where Time_Series_I/O_Activity_Outlier can represent the presence or absence and/or magnitude of an outlier within the I/O activity characteristic of the data for the time window, where Time_Series_I/O_Size_Outlier can represent the presence or absence and/or magnitude of an outlier within the I/O size characteristic of the data for the time window, and where Time_Series_Compression_Ratio_Outlier can represent the presence or absence and/or magnitude of an outlier within the compression ratio characteristic of the data for the time window.

In FIG. 3, the formula of 352 is used to classify whether an anomaly 370 is detected in a particular cycle corresponding to a particular time window, or whether a particular cycle corresponding to a particular time window is regular 375. In some embodiments, the determination of either an anomaly 370 or a regular 375 time-window can be evaluated by a customer 390. The customer 390 can provide positive and negative feedback 380 regarding the classification (370, 375) to the multi-variate time-series based machine learning model 350.

If multi-variate time-series based machine learning model 350 determines that there is an anomaly present within a current time-window, then the data for the current time window should not be immediately used to train the model. However, since the data for that current time window is stored in a temporary storage (e.g., RAM) and has not yet been transferred to a more permanent storage, a snapshot can be taken of the permanent storage that contains data up until the previous time window, before the anomaly was detected in the current time window. A snapshot of the model can also be taken, where the model has not been trained on the data with the detected anomaly from the current time window.

Therefore, if an anomaly is detected at cycle C, then local instant read-only snapshots of uncorrupted data and the local model can be taken from previous cycle C–1, in order to prevent spreading of ransomware attacks, according to some embodiments. A snapshot of the uncorrupted data and model at previous cycle C–1 can be taken, unlike other solutions that take snapshots at current instance which might include corrupted data. Since the model is good through cycle C–1, and the data is good through cycle C–1, the snapshot is immediately taken. In some embodiments, a snapshot is taken of both the model and the uncorrupted data. However, in other embodiments, a snapshot is taken of either the model or the uncorrupted data.

In some embodiments, data can be thrown out from the current cycle C, corresponding to the current time window. In FIG. 3, the data from time window T (360) can be completely thrown out, such that only the data from the previous time window and the model from the previous time window are used.

The training of the model is happening on the time window level and also at the extent level. Both of these dimensions can be used where statistics are captured. For example, when a pattern is analyzed, the compression ratio should not drastically change per extent. Assume historically that the compression ratio is very high for an incoming I/O on a particular extent. If the compression ratio changes drastically, then the system can flag that something is wrong on this incoming I/O for this particular extent. For example, assume the compression ratio is normally close to 90%, but due to a virus such as Ransomware where is it encrypts the data, the compression ratio falls to near 0% because of the encryption. This means that if historically this particular device, and this particular extent on this device, was getting high compression, and all of a sudden in the current time window, the model sees the compression ratio drop to close to 0%, then the model should not be trained on this data.

The model can also monitor and detect the I/O sizes of I/O transactions. For example, assume that a user is performing a transaction with a bank. The bank transactions will be very small in size compared to streaming video. Then, all of a sudden, a particular extent on a particular device, which was getting small I/O sizes similar to 1 KB or 2 KB with an 8 KB maximum, starts detecting huge I/O sizes that is trying to read and write 1 MB per second or 2 MB per second. Therefore, the model can flag this as an outlier, since it never has seen this distribution of I/O sizes on this particular extent of this particular storage device, where in the current time window it is seeing big I/O sizes all of a sudden. These large I/O sizes can be a sign of ransomware, because with ransomware, the goal is to corrupt as much as possible in a short duration of a time.

The model can also monitor and detect the I/O patterns of I/O transactions. For example, assume that a user is performing a transaction with a bank. This will have its own pattern of data reads and writes. The user will usually first read data, such as reading the current statement. Then the user might perform some transaction with the bank. Similarly, ransomware has its own I/O pattern. Ransomware reads a burst of I/Os, and then suddenly makes a huge amount of writes. These ransomware number of writes might be drastically different than what the I/O transactions typically performed on this particular device on this particular extent. Similarly there may be other patterns of other kinds of I/O statistics, and the patterns mentioned here should not be construed as limiting.

The multi-variate time-series based machine learning model 350 can be a time-series deep learning model, in some embodiments. Deep learning models can be very good at detecting these different type of I/O patterns. There may be other I/O patterns which the deep learning models also might catch for this particular device and extent. The deep learning model can learn over time for this particular extent from historical data. In the current time window, if any of these patterns doesn't match or they are drastically different, then the model can flag it, indicating that an anomaly is detected.

Whenever an anomaly detection happens, according to some embodiments, a snapshot can be taken of the previous time window's data and previous time window's model. In addition, the current time window's model and/or the current time window's data can be stopped from being sent to the cloud. If the data and/or model is not sent to the cloud, the models in the clouds will correspondingly not get corrupted.

Therefore, if an attack, such as a ransomware attack is occurring on an edge device, some embodiments of the systems and methods for time-series based machine learning anomaly detection and prevention can prevent the attack from occurring locally, and therefore any corruption will not spread globally. Some embodiments of the systems and methods for time-series based machine learning anomaly detection and prevention will avoid corruption of a remote location's model and data. Some embodiments of the systems and methods for time-series based machine learning anomaly detection and prevention multivariate time-series models, where the models can learn the I/O patterns based on different I/O characteristics, such as sizes, activities, and compression ratios. Some embodiments of the systems and methods for time-series based machine learning anomaly detection and prevention can take a snapshot of the model and/or the data from the previous time window, if an anomaly is detected in the current time window.

Figure 4:
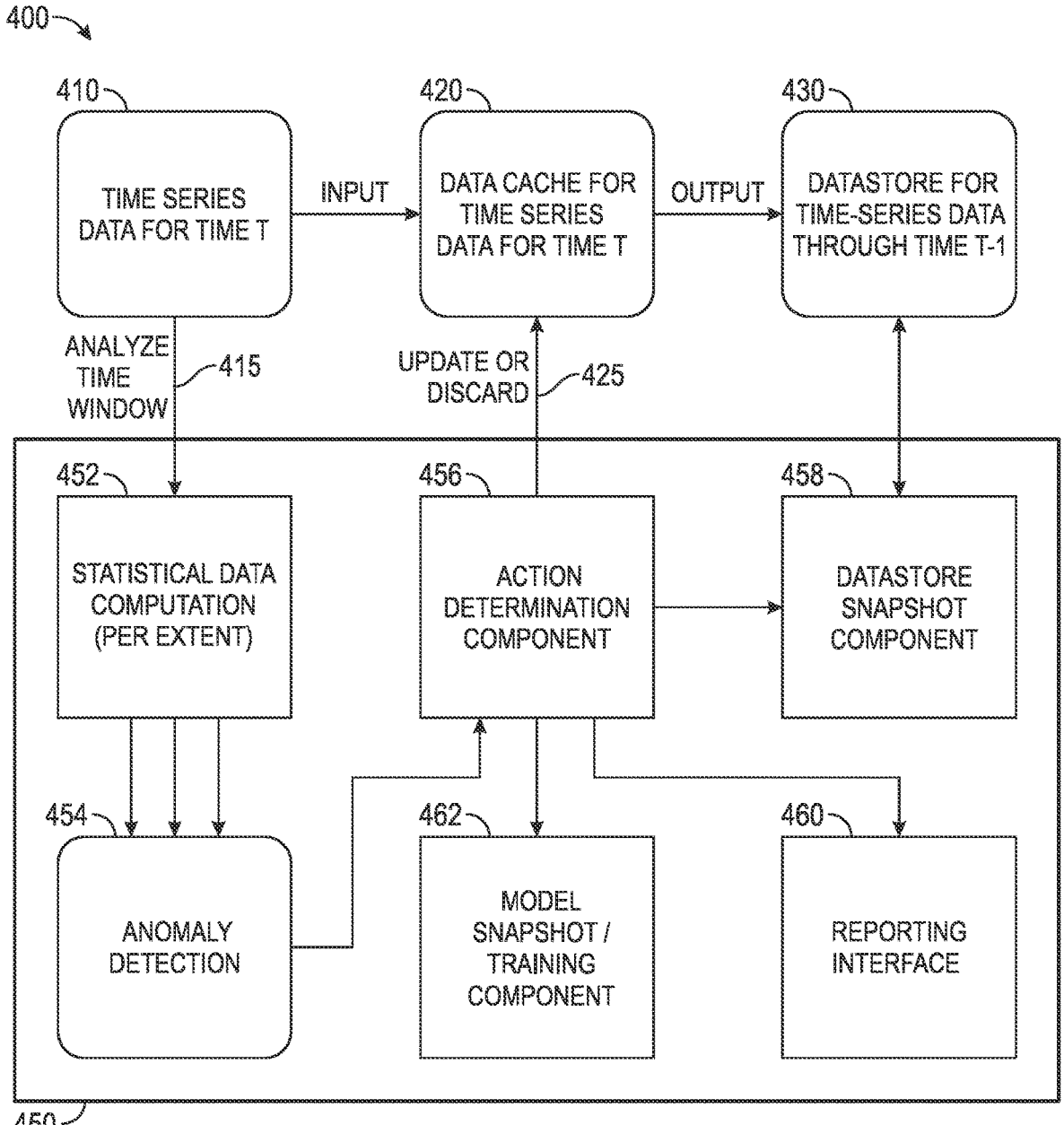
FIG. 4 is a block diagram illustrating an example system for time-series based machine learning anomaly detection and prevention using a multivariate time-series based machine learning model, according to some embodiments.

FIG. 4 is a block diagram illustrating an example system 400 for time-series based machine learning anomaly detection and prevention using a multivariate time-series based machine learning model, according to some embodiments. In some embodiments, system 200 may be instantiated, at least in part, on one or more IHSs, through the execution of program instructions stored in system memory 103 and executed by host processor(s) 101 of IHS 100.

As shown, the multivariate time-series based machine learning model 450 may consume time series data for time T 410. Time series data for time T 410 is used as input data for a data cache for time-series data for time T 420, which outputs its data, at the next time window, to a datastore for time-series data through time T–1 430. The multivariate time-series based machine learning model 450 may be any of a variety of models that can be used to make inferences or extracts information from the time series data 410 by analyzing the time window 415 for time T. For example, in some embodiments, the time series data 410 may include web traffic data, and the model may determine anomalies of various web content requested by the web traffic. In some embodiments, the time series data 410 may include performance metrics for a computing system, and the multivariate time-series based machine learning model 450 may determine anomalies of the performance metrics for the computing system. In some embodiments, the time series data 410 may include purchase histories of various users, and the multivariate time-series based machine learning model 450 may determine anomalies of the purchase histories for the users. In some embodiments, the time series data 410 may include weather data, and the multivariate time-series based machine learning model 450 may generate anomalies of the weather data for different geographical locations. These applications are merely examples, and the disclosures provided herein may be used to detect anomalies in other types of data for other modeling applications.

As shown, the multivariate time-series based machine learning model 450 may include a statistical data computation (per extent) component 452. In some embodiments, the statistical data computation (per extent) component 452 may analyze 415 the time series data 410 and determine, for individual (e.g., each) extent, and for an individual time window, whether an outlier is present for individual I/O characteristics. The individual I/O characteristics can, for example, be the 3 I/O characteristics discussed with regard to FIG. 3. For example, the statistical data computation (per extent) component 452 can flag a particular time window as an outlier if the I/O sizes 330 of the particular time window are drastically different compared to historical analysis. As another example, the statistical data computation (per extent) component 452 can flag a particular time window as an outlier if the compression (e.g., data reduction) ratios 340 of the particular time window are drastically different compared to historical analysis. As another example, the statistical data computation (per extent) component 452 can flag a particular time window as an outlier if the I/O activity 320 (such as Write-after-Read) of the particular time window are drastically different compared to historical analysis.

As shown, in some embodiments, the multivariate time-series based machine learning model may include an anomaly detection module or component 454. In some embodiments, the anomaly detector 454 may employ one or more anomaly detection methods to determine whether an anomaly exists in the time-series data for time T 410, based on one or more configurable criteria for determining anomalies. Various I/O characteristics such as, I/O size, activity (e.g., write after reads), and/or compression ratios or sizes can be considered to detect a device level anomaly. In some embodiments, the anomaly detector 454 may examine a range of points in the time-series data for time T 410 and identify multiple potential anomalies. In some embodiments, the anomaly detector 454 may compute an anomaly indicator for a range of points in the time-series data for time T 410 and report one or more anomalies with the highest anomaly indicator values as the anomalies. In some embodiments, the anomaly detector 454 may report the earliest detected anomaly in the time-series data for time T 410.

In some embodiments, the anomaly detector 454 may detect an anomaly by comparing a ratio of residual metrics before and after a potential anomaly in the time-series data for time T 410. In some embodiments, a fitting model or function for the time series data may be derived from the time series data 410. In some embodiments, the fitting model may be obtained via a decomposition of the time series data to determine one or more modeled components (e.g., seasonal or trend component) and one or more noise components. In some embodiments, the fitting model is then applied to a portion of the data before a point in the time-series data for time T 410, and a portion of the data after the point, to generate two residual metric values. When the two residual metric values are sufficiently different (e.g., when a ratio of the two deviates from 1), the detection system may report the point as an anomaly. In some embodiments, the residual metric may be computed using a likeli-hood function of residuals that may be generated from the fitting function, assuming a normal distribution of residuals.

In some embodiments, the anomaly may be detected by using a clustering technique that clusters individual time segments in the time series data 410. The individual time segments may be clustered based on the segments' data features. In some embodiments, the time series data 410 may be segmented into individual time segments. In some embodiments, the individual segments may be overlapping. In some embodiments, data features may be extracted from individual segments (e.g., the mean, variance, etc.). A clustering technique may then be performed to group the time segments, according to their data features into a plurality of clusters having similar data features. In some embodiments, the cluster assignments for segments before a point in the time-series data for time T 410, and after or including the point, are compared to generate a dissimilarity metric. In some embodiments, this dissimilarity metric is compared to a threshold to determine whether the point represents an anomaly.

In some embodiments, multiple anomaly detection methods may be used in combination to determine an anomaly in the time-series data for time T 410. For example, in some embodiments, one method such as the residual comparison method may be used as a primary method while a second method such as the clustering method may be used to corroborate the determined anomaly. In some embodiments, a cheaper or less resource or time intensive method may be used to scan the time-series data for possible anomalies, and a more resource or time intensive method may be used to verify the possible anomalies detected by the first method. In some embodiments, different methods may be used to generate respective indicators, and the indicators may be combined in a weighted combination to produce an overall score for a point as the anomaly. In some embodiments, different anomaly detection methods may be used to implement a voting scheme or in a compound detection condition to determine an anomaly.

The anomaly detector 454 can, in some embodiments, present the determination of an anomaly, or lack of an anomaly, in the time-series data for time T 410 to the action determination component 456. The action determination component 456 can determine a proper action based on the presence or absence of a detected anomaly by the anomaly detector 454. If an anomaly is detected at time T, then local instant read-only snapshots of uncorrupted data and the local model can be taken from previous time window T–1, to prevent spreading of ransomware attacks. Therefore, if an anomaly is detected at time T, the action determination component 456 can instruct the data cache for time series data for time T 420 to discard 425 the data. If, on the other hand, an anomaly is not detected at time T, the action determination component 456 can instruct the data cache for time series data for time T 420 to update 425 the data to the datastore for time-series data through time T–1 430.

The action determination component 456 of the multivariate time-series based machine learning model 450 can instruct other components to take snapshots of the uncorrupted data and model at previous time window T–1, unlike other solutions that take snapshots at current instance which might include corrupted data. As shown, in some embodiments, action determination component 456 may instruct a model snapshot/training module or component 462 to perform snapshots or updates to the model, depending on the context. In some embodiments, the action determination component 456 may be triggered to instruct the model snapshot/training component 462 because of a detection of an anomaly in the time-series data for time T 410 by the anomaly detector 454. Upon such a detection, the model snapshot/training component 462 may cause the model to be snapshotted in advance of the predicted anomaly, by snapshotting the model at time T−1. In some embodiments, this snapshotting may occur automatically with no human intervention.

Similarly, in some embodiments, action determination component 456 may instruct a datastore snapshot module or component 458 to perform snapshots to the datastore for time-series data through time T−1 430, depending on the context. In some embodiments, the action determination component 456 may be triggered to instruct the datastore snapshot component 458 because of a detection of an anomaly in the time-series data for time T 410 by the anomaly detector 454. Upon such a detection, the datastore snapshot component 458 may cause the datastore 430 to be snapshotted in advance of the predicted anomaly, by snapshotting the datastore at time T−1. In some embodiments, this snapshotting may occur automatically with no human intervention.

In some embodiments, when an anomaly is not detected in the time-series data for time T 410, the action determination component 456 may instruct the model snapshot/training component 462 to train or update the machine learning model with the data for time T. In some embodiments, the model snapshot/training component 462 may adjust one or more tunable parameters of the model. In some embodiments, the model snapshot/training component 462 may cause the model to be replaced or augmented with a different model. In some embodiments, the update may be sent as a job to a machine learning service that is hosting the machine learning model or responsible for updating the model. In some embodiments, the machine learning service may expose a programmatic interface to allow managed models to be tuned or trained based on input parameters.

In some embodiments, the manner in which the model is trained or updated by the model snapshot/training component 462 is configurable. For example, a configuration parameter may specify how a training of the model should be performed and specify a manner in which augmented training data sets are selected. In some embodiments, the configuration information may specify how a new model should be selected to replace or augment the existing model. In some embodiments, the multivariate time-series based machine learning model 450 may be configured to detect multiple different types of anomalies (e.g., a peak or a trough) and associate different model snapshots to the different types.

As shown, in some embodiments, the multivariate time-series based machine learning model 450 may implement a reporting interface 460. If an anomaly is detected, the action determination component 456 may instruct the reporting interface 460 to flag the user or administrator about anomaly detection and stop/prevent the model from learning from malicious data and spreading globally. In some embodiments, the reporting interface 460 may be an interactive graphical user interface that can visually display one or more detected anomalies for time series data 410. Users or administrators can manually inspect if the reporting interface 460 is providing false positives or negatives and provide the feedback to the model to improve it further. A user or administrator can recover to the good instant snapshots based on further manual analysis and provide feedback to the multivariate time-series based machine learning model 450 through the reporting interface 460 to reduce false alarms. If a user or administrator thinks the anomaly is genuine then he can restore the production data with automatically backed up instant snapshots, thus mitigating the attack.

In some embodiments, the reporting interface may be a programmatic interface. In some embodiments, the reporting interface may implement a callback interface, where a client may register as a listener to be notified when an anomaly is detected. For example, a stock trading application may use the multivariate time-series based machine learning model 450 to monitor stock prices, so that when a specified anomaly is detected in price movement, a notification is automatically forwarded to the stock trading application. Depending on the embodiment, the notification may be a message sent via a particular protocol, an update to a data repository, or a write to a log, among other things. In some embodiments, the listening application (e.g., the stock trading application) may respond to the notification by performing particular actions (e.g., sell a stock).

Figure 5:
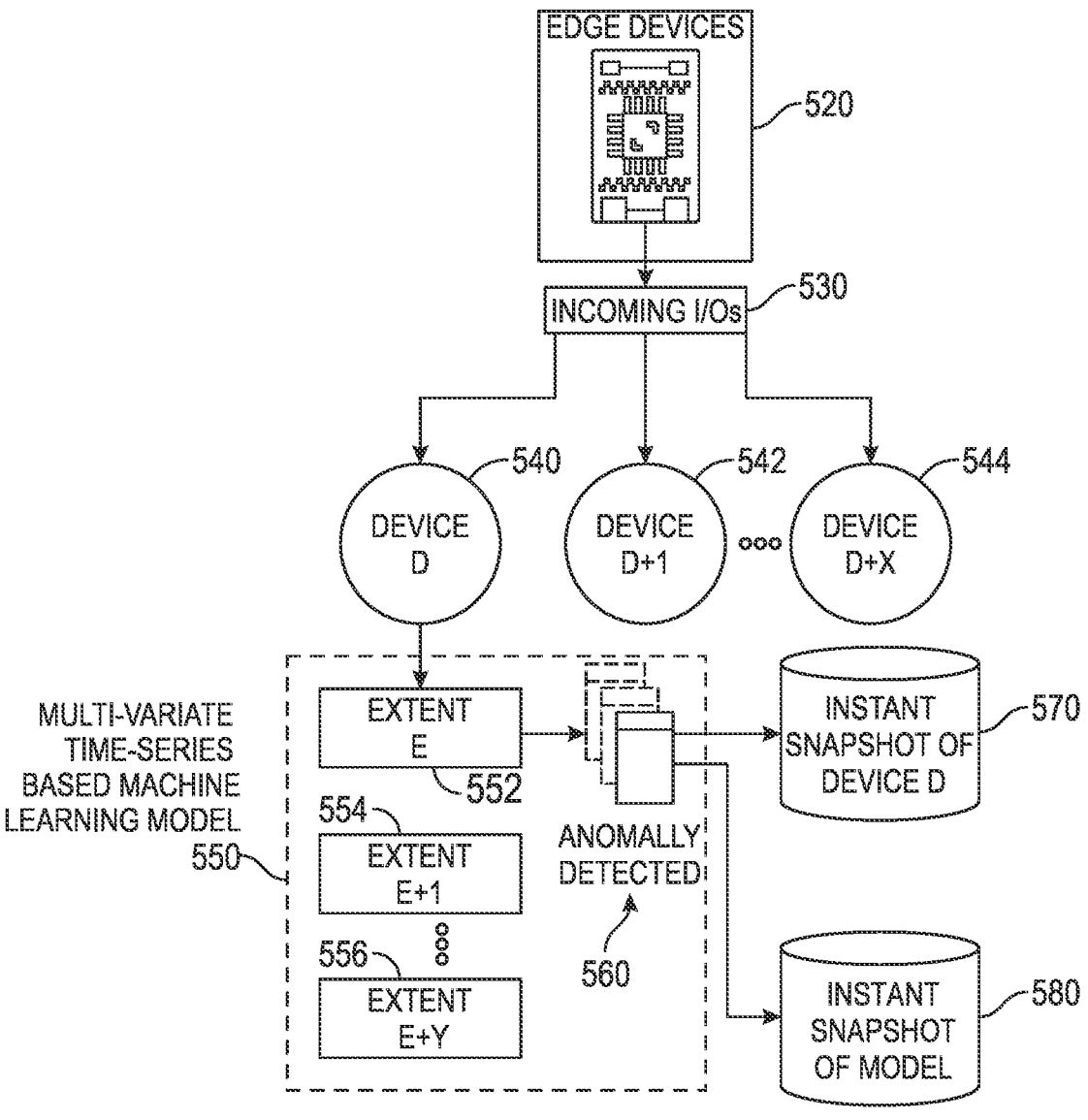
FIG. 5 is a data flowchart illustrating an example of system and method for time-series based machine learning anomaly detection and prevention.

FIG. 5 is a data flowchart 500 illustrating an example of system and method for time-series based machine learning anomaly detection and prevention. In some embodiments, the data flowchart 500 may be performed, at least in part, by operation of system 400.

Incoming I/Os 530 are received by edge devices 520. Those incoming I/Os 530 are destined to be read or written to one of multiple storage devices (540, 542, 544), and one of multiple extents (552, 554, 556) within that particular storage device. In FIG. 5, there are an X number of storage devices ranging from 1 to X−Device D (540), Device D+1 (542), . . . Device D+X (544). Each storage device can be broken down into one or more extents. In FIG. 5, storage device D (540) is divided into a Y number of extents. The extents are Extent E (552), Extent E+1 (554), . . . Extent E+Y (556). Multiple statistics, where the statistics can be put into a time-series, are captured per extent. The statistics can be for example: (1) I/O write/read: captures I/O activity such as write after read; (2) I/O Size (e.g., in KB): captures the I/O size pattern; and/or (3) Compression ratio: captures I/O compressibility pattern.

The various time-series (corresponding to the various statistics) can be split into sliding windows of a particular duration (e.g., 10 minutes). In every time window, the multivariate time-series based machine learning model 550 can analyze statistical outliers per time-series to detect outliers. A time window can be flagged as outlier if, for example: (1) the new I/O Sizes are drastically different compared to historical analysis; (2) the compression (e.g., data reduction) ratios are drastically different compared to historical analysis; and/or (3) the I/O activities (such as, Write after Read) are drastically different compared to historical analysis.

Each time-series can be weighted, and aggregated time window classification can be used to classify if an anomaly is detected 560. In FIG. 5, an anomaly is detected for Extent E 552 of Device D 540. An instant local snapshot of uncorrupted data 570, and the local model from previous cycle 580, can be taken as soon as the model detects an anomaly at the current cycle. The snapshot can be taken of just the Extent E, or of the entire device D, or of all devices D . . . D+X, depending on the embodiment. The multivariate time-series based machine learning model 550 can avoid rebuilding the local model from malicious data, and thus stop propagating the malicious model across the globe. Users or administrators can manually inspect if the multivariate time-series based machine learning model 550 is providing false positives or negatives, and provide feedback to the model to improve it further. If a user or administrator thinks the anomaly is genuine, then the user or administrator can restore the production data with automatically backed up instant snapshots, thus mitigating the attack.

Figure 6:
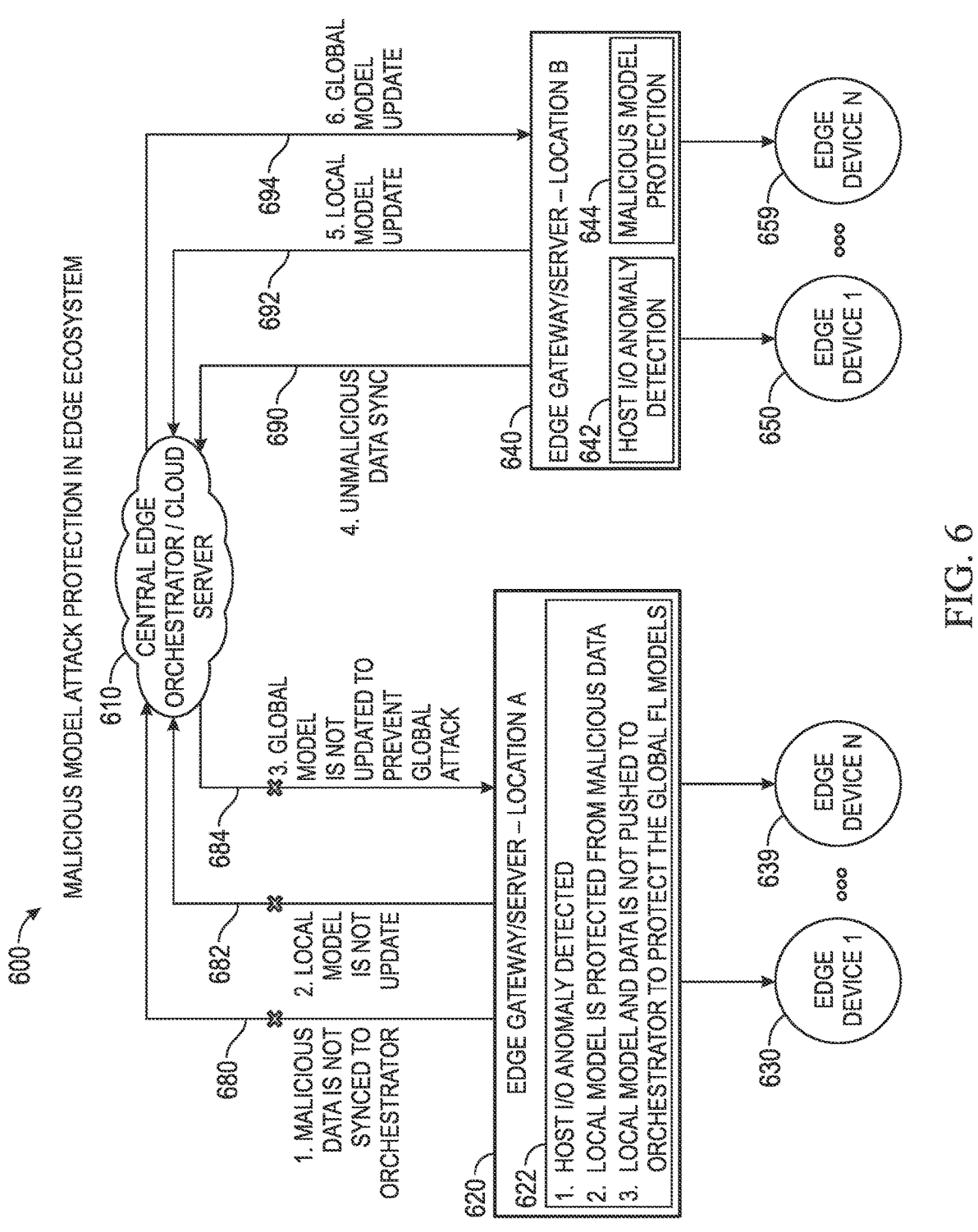
FIG. 6 is a diagram illustrating an example of malicious model attack protection in an edge ecosystem, using time-series based machine learning anomaly detection and prevention, according to some embodiments.

FIG. 6 is a diagram illustrating an example of malicious model attack protection in an edge ecosystem 600, using time-series based machine learning anomaly detection and prevention, according to some embodiments. In some embodiments, the components of the edge ecosystem 200 may be instantiated, at least in part, through the execution of program instructions stored in system memory 103 and executed by one or more host processor(s) 101 of one or more IHSs 100.

In FIG. 6, there are multiple edge devices (630 . . . 639, 650 . . . 659). Those edge devices are connected to the gateways (620, 640) and those gateways communicate with the central edge orchestrator/cloud server 610. FIG. 6 depicts the edge gateways and/or servers (620, 640) that employ "back-in-time" data protection methods and mechanisms. For example, edge gateway/server at location A (620) employs a host input-output ("I/O") anomaly detection component and a malicious model protection component. As another example, edge gateway/server at location B (240) also employs a host I/O anomaly detection component 642 and a malicious model protection component 644. The host I/O anomaly detection component can include the multivariate time-series based machine learning model (350, 450, and/or 550) of FIGS. 3, 4, and/or 5, in some embodiments.

Edge gateway/server at location A (620) will provide host I/O anomaly detection and/or malicious model protection before engaging in any data synchronization operation 680, a local model update operation 682, or a global model update operation 684. Edge gateway/server at location B (640) will provide host I/O anomaly detection 642 and/or malicious model protection 644 before engaging in a data synchronization operation 690, a local model update operation 692, or a global model update operation 694.

In FIG. 6, the edge gateway/server at location A (620) has performed a number of actions 622. First, a host I/O anomaly has been detected at a current time window. Second, the local model has been protected from malicious data. Third, the local model and data has not been pushed to the orchestrator to protect the global federated learning ("FL") models. Therefore, as shown in FIG. 6, malicious data is not synchronized to the orchestrator 680. In addition, the local model is not updated 682. In addition, the global model is not updated to prevent a global attack 684.

The edge ecosystem can have a federated learning embedded, where the federated learning is applied to the edge ecosystem. The edge servers can be part of a network like a content delivery network ("CDN") or some kind of cloud network. The federated learning can be applied to the edge ecosystem. During a malicious attack, such as a ransomware attack or some other type of attack that keeps happening to every organization, the attack must first be identified. In addition, the attack (e.g., ransomware attack) needs to be identified in a federated learning infrastructure applied to the Edge ecosystem.

With federated learning, unmalicious data can be synchronized 690, the local model can be synched up 692 with the global model of the central edge orchestrator/cloud server 610, and the global model can distribute a new version of the model 694 to all the appropriate edge servers (640) and/or edge devices (650 . . . 659), when anomalies are not detected. The federated learning architecture could also be applied to a network of Internet of Things ("IoT") like small devices where just malicious activity might be detected, instead of ransomware.

FIGS. 7A and 7B illustrate example user interfaces to configure different aspects of a time-series based machine learning anomaly detection and prevention system, according to some embodiments. These user interfaces can be used by administrators as well.

In some embodiments, as shown, the multivariate time-series based machine learning model (350, 450, 550) may implement an anomaly detection configuration interface 700 and a model action configuration interface 730. In some embodiments, the multivariate time-series based machine learning model may be configured via the anomaly detection configuration interface 700 to monitor different sources of time series data 710 and update different consuming models 760. In some embodiments, the configuration interfaces (700, 730) may be an interactive graphical user interface. In some embodiments, the configuration interfaces (700, 730) may be a programmatic interface. In some embodiments, the configuration interfaces (700, 730) may include a data repository that stores the configuration data of the system. In some embodiments, the configuration data may be stored as one or more metadata files.

The configuration interfaces (700, 730) may be used to adjust different parameters of the various components in the multivariate time-series based machine learning model (350, 450, 550). For example, in some embodiments, the configuration interface may allow for the configuration of different parameters that control how an anomaly detection method is performed. For example, an anomaly detection threshold may be specified as a configurable parameter. In some embodiments, the anomaly threshold may be determined by a function, which may be controlled by one or more configurable parameters. In some embodiments, the configuration interface may allow a new or custom anomaly detection method to be added to the system 450.

FIG. 7A depicts a user interface 700 that can be used to combine multiple anomaly detection methods to detect anomalies in the time series data. As shown, the user interface 700 allows a user to select different ones of three different methods, including an I/O activity-based method, an I/O size-based method, and a compression ratio-based method. In this example, the first two methods are used, and they are combined using respective weights into an overall anomaly indicator. For example, the I/O activity-based method may be used to generate a first indicator, and the I/O size-based method may be used to generate a second indicator, and the two indicators may be combined in a linear combination based on the configured weights. Different embodiments may allow the methods to be combined in different fashion. In some embodiments, a first method may be used as a first pass to identify possible anomalies, and a second method may be used to corroborate the choices of the first method. In some embodiments, multiple methods may be used to cast votes to arrive at the ultimate determination for a point. In some embodiments, an anomaly detection condition may be a compound condition that depends on satisfying multiple methods under multiple thresholds.

As shown, in some embodiments, the user interface 700 may allow the user to add methods for detecting anomalies in the time series data. In this example, an ADD button 710 is provided, which may be clicked to display a user interface to perform this functionality. In some embodiments, a user may be able to provide a code module or executable that may be invoked via the anomaly detection system. In some embodiments, the supplied code module or executable may implement a particular invocation interface specified by the anomaly detection system, so as to provide a signal or indication of whether a particular point is an anomaly. For example, in some embodiments, the anomaly detection may itself be performed via a machine learning model, which was trained to detect custom anomalies in the time series data.

FIG. 7B depicts a user interface 730, which may be used to configure responsive actions performed by the anomaly detection system upon the detection of an anomaly. In this example, multiple responsive actions may be performed.

As shown, the anomaly detection system may be configured to notify a client when anomalies are detected. In some embodiments, the client may be an owner of the machine learning model. In some embodiments, the configuration interface 730 may provide an interface (e.g. via the CONFIGURE button 740) to configure how the notification is performed. Depending on the embodiment, the notification may be displayed on an interactive user interface, used to generate a programmatic call, pushed via a message, email, or text, or logged to a log file or data store, among other possibilities.

As shown, the anomaly detection system may also be configured to take responsive action by taking a snapshot of the data. This action may be configurable via button 750. As shown, the anomaly detection system may also be configured to take responsive action by discarding time-series data. This action may be configurable via button 770. As shown, the anomaly detection system may also be configured to take responsive action by taking a snapshot of the model. This action may be configurable via button 780.

As shown, the anomaly detection system may also be configured to take responsive action by changing the model parameters that consumes the time series data. This action may be configurable via button 760. In some embodiments, this action may be performed via a call or job submission to a machine learning service. In some embodiments, an anomaly detection may trigger a change to one or more parameters of the model. For example, in some embodiments, a model may expose one or more switches that allows portions of it to be switched on or off during execution. In some embodiments, as shown, the responsive action may involve switching to a different model. In some embodiments, when fundamental changes are detected in the time series data, a completely different model may be selected to handle the new data.

As discussed, in some embodiments, the anomaly detection system may be implemented as a multiuser service. Thus, each user may create different agents to monitor different sources of time series data, and in some embodiments, update their time-based models according to custom anomaly detection methods. In some embodiments, multiple time series data may be monitored to update a single model. In some embodiments, a single time series data may be used to update multiple models. In some embodiments, a user may specify different types of anomalies within a single time series data, which may be used to trigger different types of updates to the model.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, wherein the memory comprises program instructions stored thereon that, upon execution by the processor, cause the IHS to:
obtain communication data of the IHS for a particular time window;
determine, using a machine learning model, that the communication data for the particular time window comprises an anomaly; and
based, at least in part on the determination, perform one or more actions;
wherein in response to the determination, performing the one or more actions, the one or more actions include preventing the machine learning model from being updated with the communication data for the particular time window.

2. The IHS of claim 1, wherein the machine learning model comprises a multivariate time-series based machine learning model.

3. The IHS of claim 1, wherein the program instructions further cause the IHS to:
obtain communication data of the IHS for previous time windows before the particular time window, wherein the machine learning model was updated using the communication data of the IHS for previous time windows.

4. The IHS of claim 3, wherein to determine, using the machine learning model, that the communication data for the particular time window comprises the anomaly, the program instructions further cause the IHS to:
based, at least in part, on the communication data for the particular time window and the communication data for the previous time windows, determine time-series data for a plurality of attributes of the communication data;
determine, based, at least in part, on the time series data, that at least one of the plurality of attributes of the communication data comprise an outlier in the particular time window; and
determine that the communication data for the particular time window comprises the anomaly based, at least in part, on the outlier of the at least one attribute of the communication data in the particular time window.

5. The IHS of claim 4, wherein the plurality of attributes of the communication data comprise an input/output (I/O) activity of the communication data.

6. The IHS of claim 4, wherein the plurality of attributes of the communication data comprise an input/output (I/O) size of the communication data.

7. The IHS of claim 4, wherein the plurality of attributes of the communication data comprise a compression ratio of the communication data.

8. The IHS of claim 1, wherein the machine learning model comprises a multivariate time-series based machine learning model, and wherein to determine, using the multivariate time-series based machine learning model, that the communication data for the particular time window comprises the anomaly, the program instructions further cause the IHS to:
determine a plurality of weights for a respective plurality of attributes of the communication data;
determine, using the multivariate time-series based machine learning model, information regarding each of the plurality of attributes of the communication data for the particular time window; and
determine that the communication data for the particular time window comprises the anomaly based, at least in part, on the plurality of weights for the respective plurality of attributes, and the information regarding each of the plurality of attributes for the particular time window.

9. The IHS of claim 1, wherein the one or more actions further include discarding the communication data of the IHS for the particular time window.

10. The IHS of claim 1, wherein the one or more actions further include taking a snapshot of the machine learning model.

11. The IHS of claim 1, wherein the one or more actions further include taking a snapshot of stored communication data of the IHS for previous time windows before the particular time window.

12. The IHS of claim 1, wherein the one or more actions further include reporting the anomaly to a user or administrator of the IHS.

13. An Information Handling System (IHS), comprising:
a processor; and
a memory coupled to the processor, wherein the memory comprises program instructions stored thereon that, upon execution by the processor, cause the IHS to:
obtain communication data of the IHS for a particular time window;
determine, using a machine learning model, that the communication data for the particular time window comprises an anomaly; and
based, at least in part on the determination, perform one or more actions;
wherein the IHS is an edge gateway or an edge server, and wherein in response to the determination, performing the one or more actions, the one or more actions include preventing a synchronization of the communication data with a central edge orchestrator.

14. The IHS of claim 13, wherein the machine learning model comprises a multivariate time-series based machine learning model.

15. An Information Handling System (IHS), comprising:
a processor; and
a memory coupled to the processor, wherein the memory comprises program instructions store thereon that, upon execution by the processor, cause the IHS to:
obtain communication data of the IHS for a particular time window;
determine, using a machine learning model, that the communication data for the particular time window comprises an anomaly; and
based, at least in part on the determination, perform one or more actions;
wherein the IHS is an edge gateway or an edge server, and wherein in response to the determination, performing the one or more actions, the one or more actions include preventing the machine learning model from being transmitted to a central edge orchestrator.

16. The IHS of claim 15, wherein the machine learning model comprises a multivariate time-series based machine learning model.

\* \* \* \* \*